(12) United States Patent
Todd et al.

(10) Patent No.: US 6,272,815 B1
(45) Date of Patent: Aug. 14, 2001

(54) SERVO-CONTROLLED POUCH MAKING APPARATUS

(75) Inventors: James E. Todd; Thomas E. Brooker; Gregory A. Conn, all of Sarasota, FL (US)

(73) Assignee: Klockner-Bartelt, Inc., Sarasota, FL (US)

( * ) Notice: Subject to any disclaimer, the term of this patent is extended or adjusted under 35 U.S.C. 154(b) by 0 days.

(21) Appl. No.: 09/185,039

(22) Filed: Nov. 3, 1998

(51) Int. Cl.$^7$ .......................... B65B 57/00; B65B 57/02; B65B 43/04
(52) U.S. Cl. .................................. 53/562; 53/51; 53/64
(58) Field of Search ................... 53/562, 568, 399.2, 53/51, 64

(56) References Cited

U.S. PATENT DOCUMENTS

| | | | |
|---|---|---|---|
| 2,951,325 | * 9/1960 | Podlesak et al. | 53/550 |
| 3,553,934 | * 1/1971 | Johnson et al. | 53/562 |
| 3,975,888 | 8/1976 | Jones | 53/386 |
| 4,201,031 | * 5/1980 | Wiles | 53/562 |
| 4,436,576 | 3/1984 | Seiden | 156/543 |
| 4,548,018 | 10/1985 | Wojnicki | 53/51 |
| 4,580,473 | 4/1986 | Seiden et al. | 83/23 |
| 4,617,785 | * 10/1986 | Chikatani et al. | 53/562 |
| 4,726,168 | * 2/1988 | Seko | 53/64 |
| 4,825,625 | * 5/1989 | Hufford | 493/197 |
| 4,849,040 | 7/1989 | Wood | 156/204 |
| 4,999,968 | 3/1991 | Davis | 53/133.1 |
| 5,058,364 | 10/1991 | Seiden et al. | 53/455 |
| 5,080,747 | * 1/1992 | Veix | 53/562 |
| 5,094,657 | 3/1992 | Dworak et al. | 493/208 |
| 5,181,365 | 1/1993 | Garvey et al. | 53/455 |
| 5,187,917 | 2/1993 | Mykleby | 53/434 |
| 5,222,422 | 6/1993 | Benner, Jr. et al. | 83/37 |
| 5,315,807 | 5/1994 | Restle et al. | 53/51 |
| 5,353,573 | 10/1994 | Durrant | 53/410 |
| 5,359,832 | * 11/1994 | Hartman et al. | 53/562 |
| 5,699,653 | 12/1997 | Hartman et al. | 53/455 |
| 5,722,217 | 3/1998 | Cloud | 53/455 |
| 5,862,653 | * 1/1999 | Solano | 53/562 |
| 6,050,061 | * 4/2000 | Todd et al. | 53/562 |

FOREIGN PATENT DOCUMENTS

| | | |
|---|---|---|
| 2142480 | 8/1995 | (CA) . |
| 89810699.2 | 4/1990 | (EP) . |
| 89123703.4 | 7/1990 | (EP) . |

* cited by examiner

*Primary Examiner*—Brian L. Johnson
*Assistant Examiner*—Matthew Luby
(74) *Attorney, Agent, or Firm*—Leydig, Voit & Mayer Ltd

(57) ABSTRACT

A motor-driven and controlled packaging machine for forming pouches from a web of material. The controls allow the machine to be run with either a continuously or intermittently advancing web. Seal bars are mounted on moveable carriages which move with the web as they form the seals. A web unwind is servo controlled to minimize the amount of festoon section needed when operating in intermittent mode. Each registration-related component of the machine has a dedicated sensor for independently registering each component with the web. Accordingly, the machine may regain registration with minimal web waste and can be quickly and easily repositioned for different pouch sizes.

6 Claims, 7 Drawing Sheets

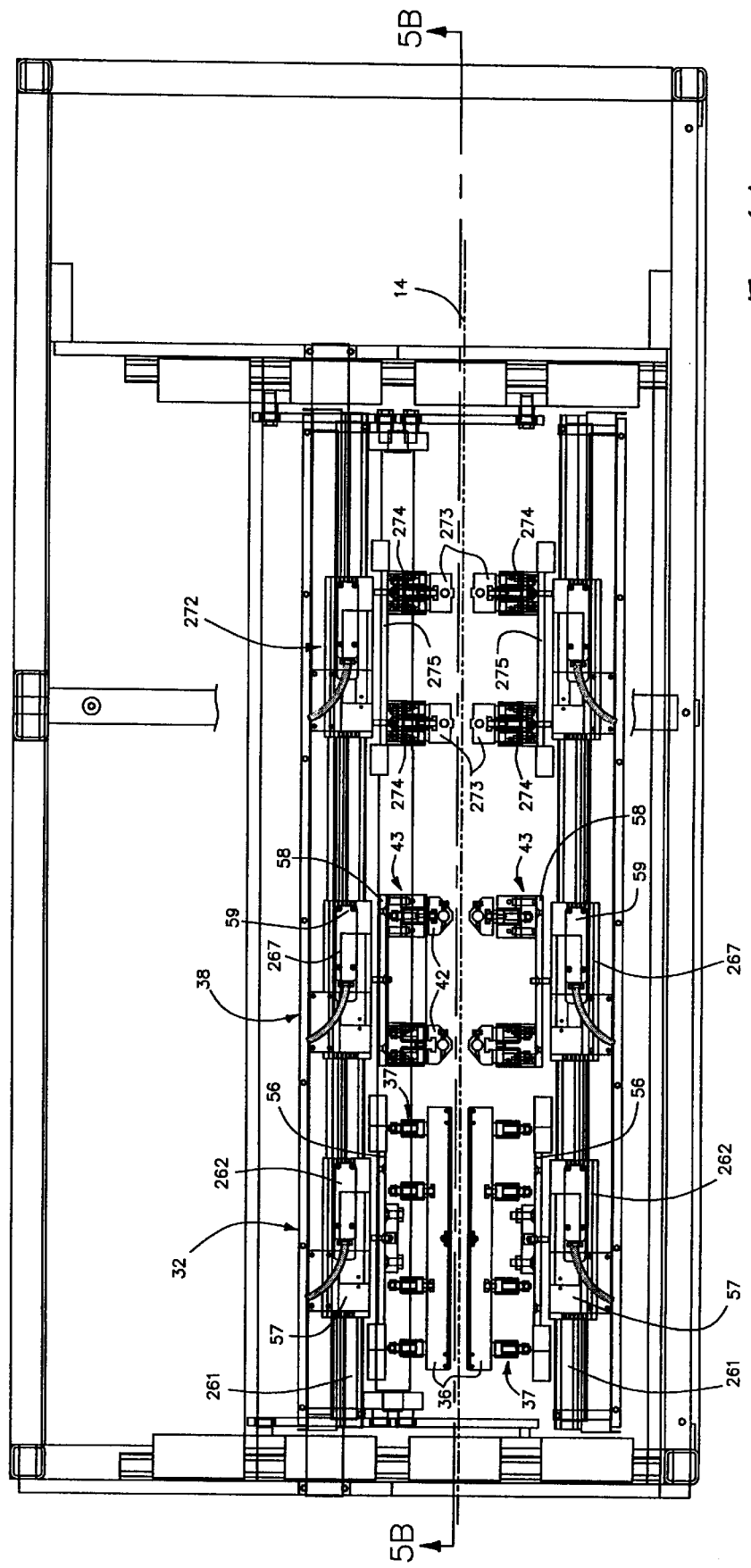

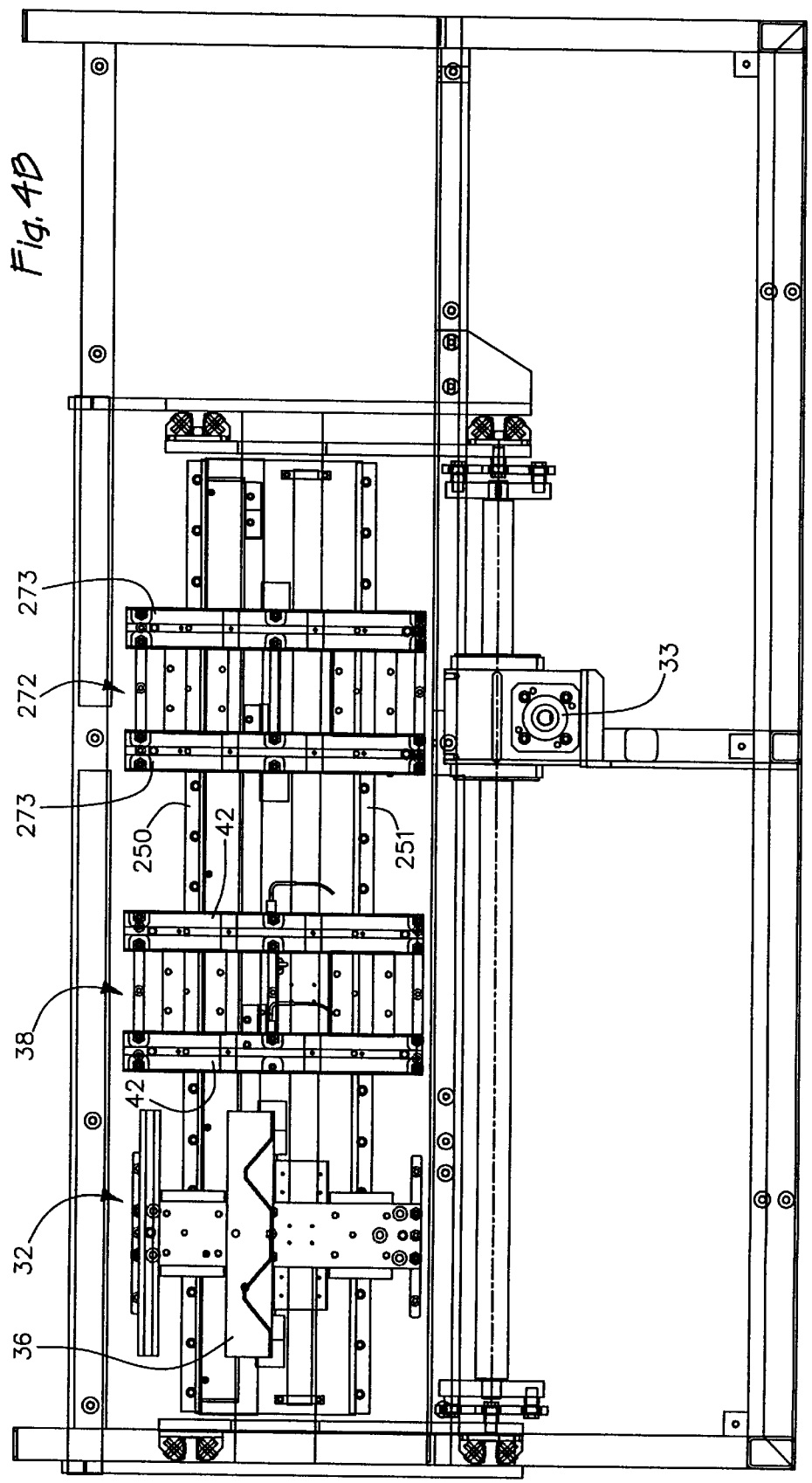

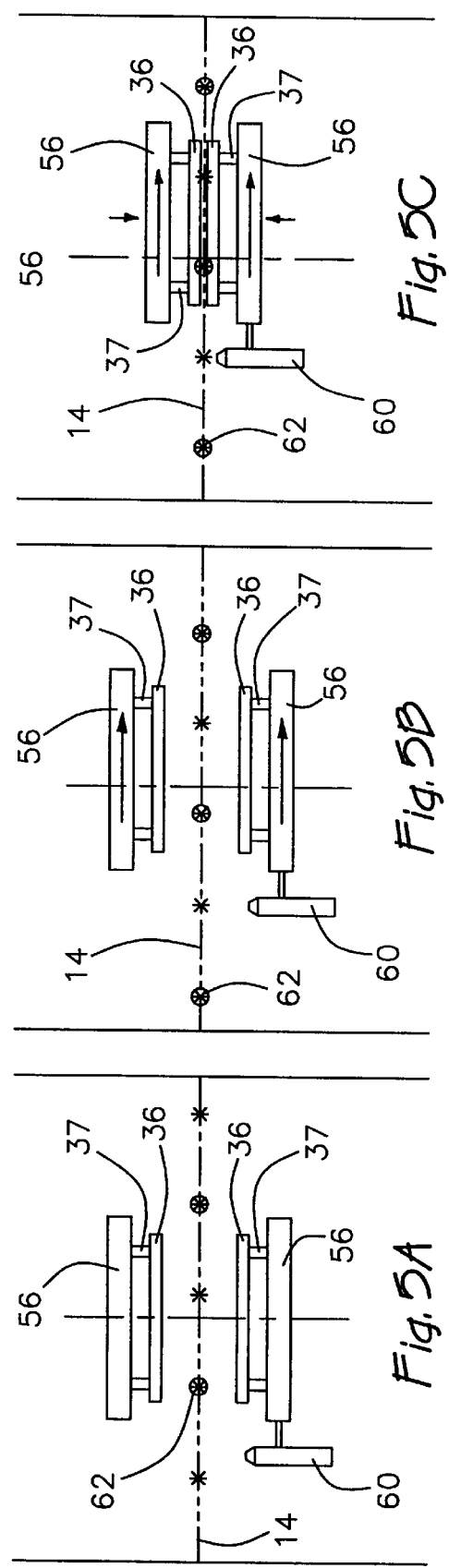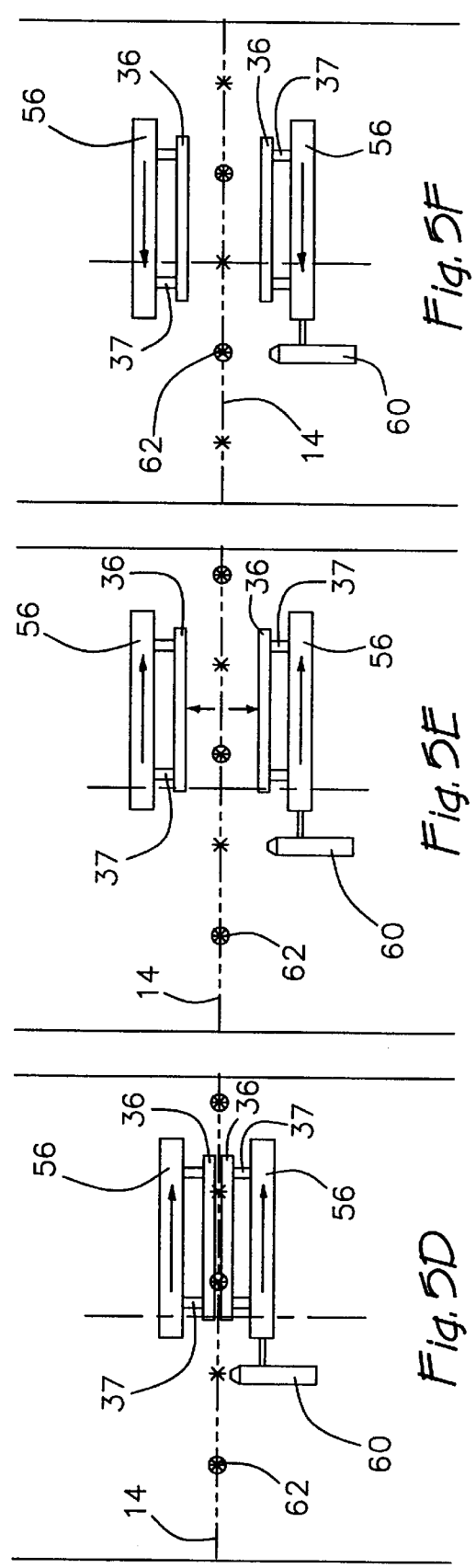

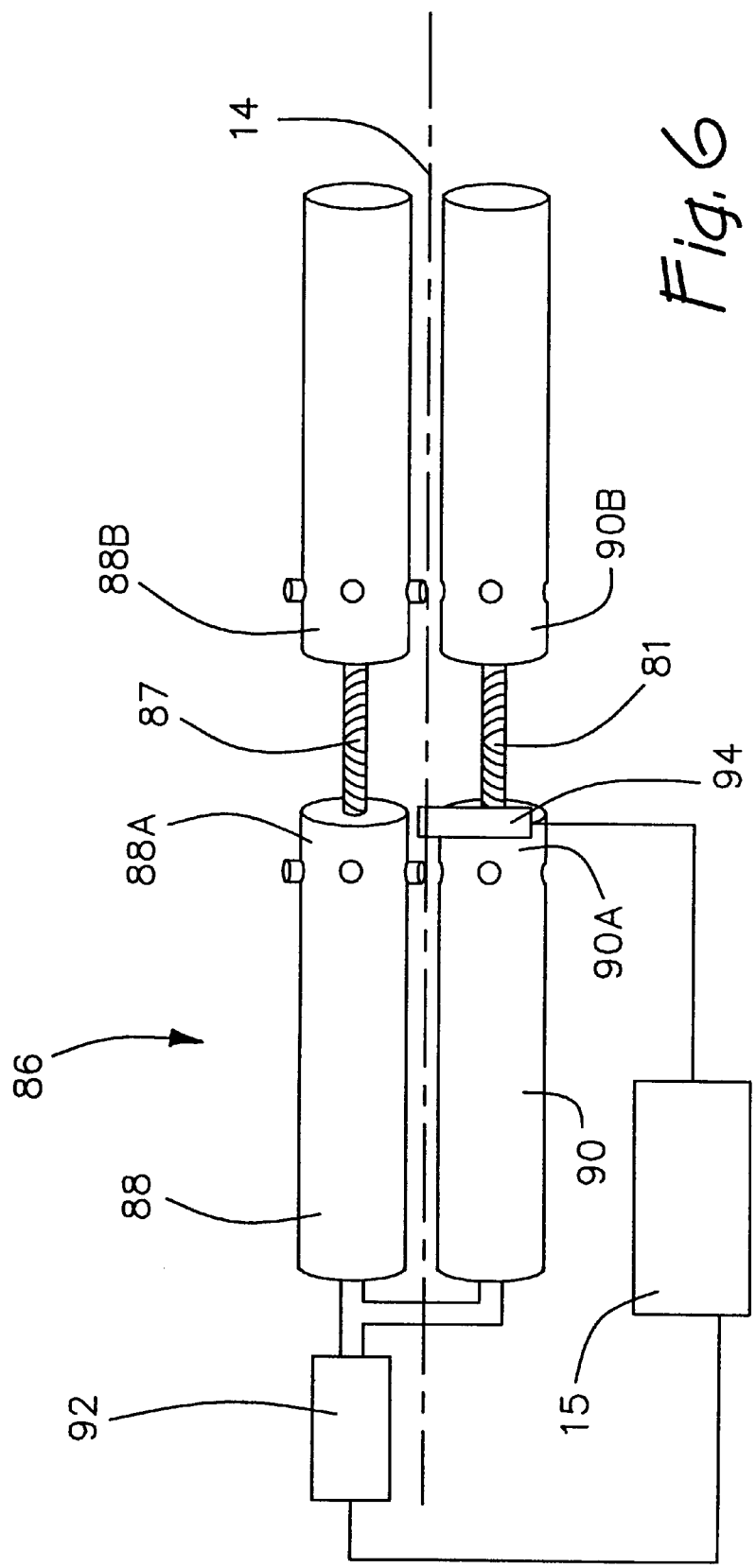

SERVO-CONTROLLED POUCH MAKING APPARATUS

FIELD OF THE INVENTION

The present invention relates to packaging machines, and more particularly relates to horizontal form, fill, and seal packaging machines.

BACKGROUND OF THE INVENTION

Packaging machines are generally known in which a continuous web of material is converted into a plurality of individual pouches. The continuous web of material is folded in half over a plow to form two continuous side panels joined by a bottom fold. The folded web is passed through a series of seal bars which form transverse seals in between the side panels, thereby forming a strip of pouches interconnected by transverse seals. A cutter cuts through each transverse seal to form individual pouches with unsealed top edges. The individual pouches are transferred to a pouch filler, filled with product, and sealed. The sealed pouches are then collected for transport. Machines of this type may be categorized as either horizontal or vertical machines, depending on the general direction of web travel. The present invention relates to horizontal packaging machines in which the web travels horizontally.

The type and volume of product being packaged often determines whether the packaging process should use a continuously or intermittently advancing web. Certain products, such as hard candy, require a fill based on weight instead of volume. Scale fillers require relatively long periods to fill a pouch. As a result, slower cycle continuous motion or intermittent motion is required to provide additional fill time. In addition, larger volume fills require more time, and therefore intermittent motion through the filler may be necessary. More free flowing products, such as sugar, may be dispensed using a diving funnel suitable for filling continuously advancing pouches.

In light of the above, packaging machines have been developed specifically for either intermittent or continuous operation. In most conventional intermittent motion machines, the web is intermittently advanced between dwell periods, and operations are performed on the web during the dwells. In a continuous web motion machine, on the other hand, the web continually moves at a set rate and each station for performing operations is phased with the web to perform the operation as the web passes through the station.

The seal, cut, and other components of a packaging machine must be properly registered with the web, and with each other, to form pouches at the appropriate points along the continuous web. The web material is typically supplied with pre-printed artwork, such as brand names, designs, and other printed matter. As a result, not only must the components of the machine be properly spaced so that, for example, the vertical side sealers and the cutter perform at the same operative point, but the web must also be positioned in relation to the machine in general so that the operative point at which the components are performing aligns with the pre-printed artwork on the web.

Achieving registration in most conventional packaging machines, having either a continuously or intermittently advancing web, is overly difficult. Conventional packaging machines employ a number of components to perform various pouch forming, filling, and sealing operations. For example, the machines typically have one or more seal stations which contact the web to form side and bottom seals in the web. A cutter subsequently cuts the side seals to form individual pouches. The individual pouches are transferred to a device which carries the pouch through a pouch filler.

Registration is typically achieved one component at a time. Starting at the first seal station, for example, web material is fed through the machine and either the seal station or the web must be adjusted so that seals are formed at the desired points along the web. A similar procedure is used for the subsequent sealers, the cutter, and any other component requiring registration with the web. This conventional registration process requires a significant amount of time and labor, and wastes a significant amount of web material.

Related to the registration problem is the difficulty of adjusting conventional packaging machines to run different pouch sizes. As noted above, packaging machines employ a number of components for performing various pouch forming, filling, and seal operations. When pouch size is altered, each component must be repositioned or reconfigured to regain registration.

Some packaging machines, such as the continuous web advancing machine disclosed in U.S. Pat. No. 5,722,217 to Cloud, are overly burdensome to adjust and may only be adapted for a limited number of pouch sizes. The '217 device uses a sealing drum to form the vertical seals of the pouches. Sealing wires are circumferentially spaced about the sealing drum to provide sealing points. To adjust pouch width, the wiring configuration of the sealing wires must be changed. Even after making this adjustment, the sealing drum is capable of forming only a limited number of pouch widths which correspond with the spacing of the sealing wires. Another sealing drum having a different sealing wire arrangement must be used in order to form pouches having other pouch widths.

Other machines use components which are similarly difficult to adjust. U.S. Pat. No. 5,222,422 to Benner, Jr. et al., for example, discloses a machine using a cutter drum. A cone inside the drum is adjusted to change the radial position of the knives, thereby adjusting for different pouch widths. Once the cone is adjusted, the web must be run to verify that the knives cut at the desired pouch width. Readjustment and further testing may be required before the knives are properly positioned.

Adjustment of components in machines having an intermittently advancing web, while sometimes easier than in continuous web motion machines, is still overly cumbersome. The components of an intermittent web machine are positioned to contact the web at the appropriate location during a web dwell. It will be appreciated, therefore, that the components are typically spaced in increments equal to one or more pouch widths. A change in pouch width, therefore, requires repositioning of each component. Again, web material is run to determine whether the components are properly positioned, and readjustment may be necessary. Most conventional packaging machines are, accordingly, overly difficult to adjust for different pouch widths.

It will be appreciated that there are a number of different situations in which registration must be set. For example, registration adjustments are required when feeding a new web through the machine. In addition, the components must be adjusted when changing pouch sizes, or in the event of a web break. Accordingly, it is important for a packaging machine to quickly and easily achieve registration, while minimizing the amount of wasted web material.

SUMMARY OF THE INVENTION

A general aim of the present invention is to provide a packaging machine in which components of the machine are quickly and easily brought into registration with a web of material.

A related object of the present invention is to provide a packaging machine which quickly and easily adjusts for different pouch widths.

In that regard, it is an object of the present invention to provide a packaging machine which minimizes the amount of web material wasted as registration is achieved.

Another object of the present invention is to provide a packaging machine which can achieve registration while running either a continuously or an intermittently advancing web.

In light of the above, the present invention provides a packaging machine in which the components are independently servo-controlled to quickly achieve registration with a web having preprinted registration marks. The packaging machine comprises at least one servo-controlled seal station mounted on a moveable carriage. A seal sensor senses a registration mark on the web and delivers a position signal to a carriage controller. The carriage controller drives a servomotor to position the carriage with respect to the marks. Seal bars on the seal station then seal the web at the appropriate points along the web in relation to the registration mark, registration being provided by the above-mentioned control. After the seal is formed, the sensor seeks a subsequent registration mark to position the carriage in relation to that mark. Cutter rolls downstream of the seal station are also servo-controlled. A cutter sensor senses the registration marks on the web and delivers a cut signal to a cutter controller. The cutter controller drives a cutter servomotor so that the cutter rolls are actuated at the appropriate points on the web in relation to the registration marks.

The above controls register each component independently and therefore registration throughout the packaging machine is achieved with minimal wasted web material. In addition, each component is independently controlled to adjust for different pouch widths, thereby minimizing down time and labor needed to switch the machine over for different pouch sizes.

These and other aims, objectives, and features of the invention will become more apparent from the following detailed description when taken in conjunction with the accompanying drawings.

BRIEF DESCRIPTION OF THE DRAWINGS

FIGS. 4A and B are enlarged top and side views of the currently preferred sealing section.

FIGS. 5A–F are schematic top views of a seal station performing a box motion.

FIG. 6 is a schematic side view of the rotary delta punch and associated controls.

Figure 1:
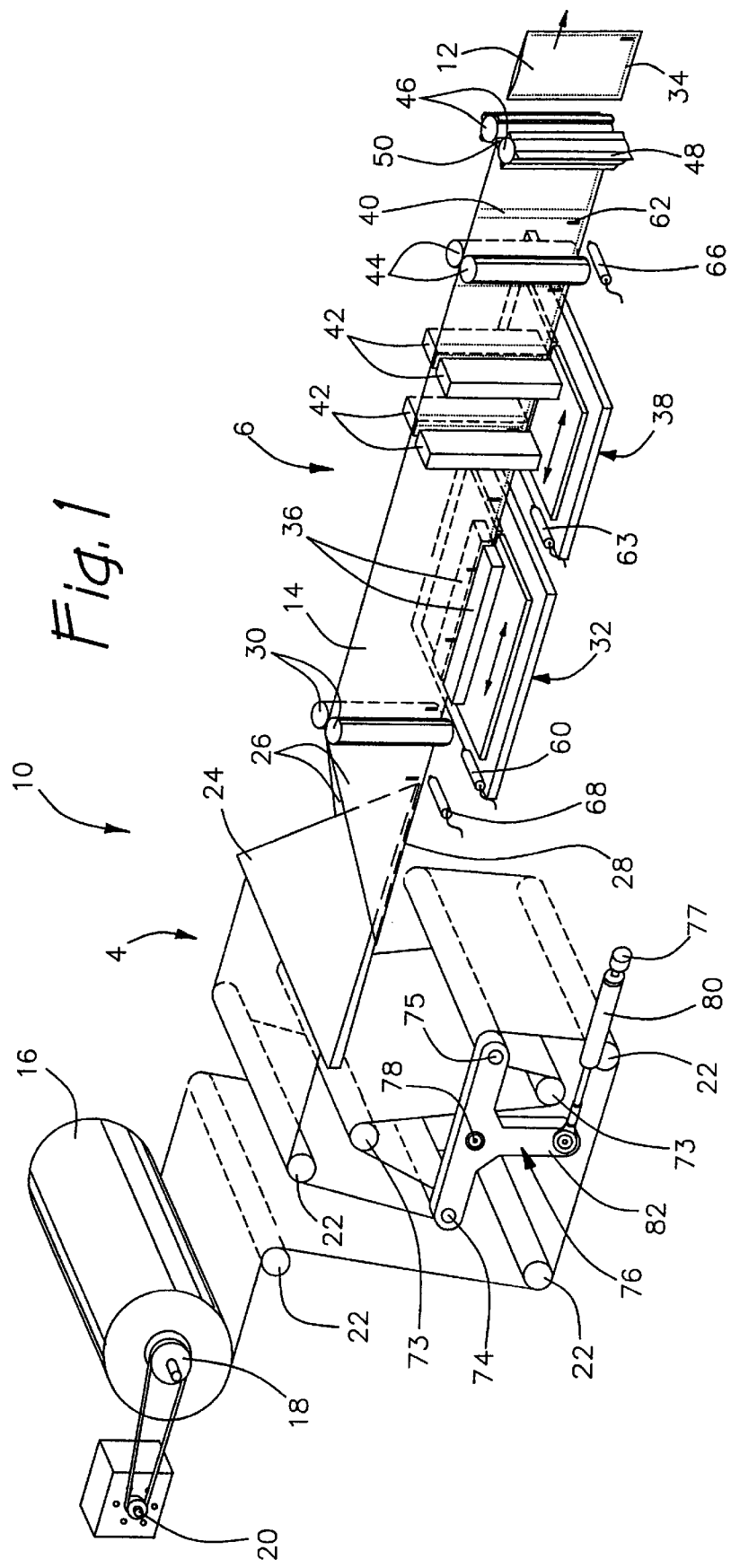
FIG. 1 is a schematic view in perspective of a packaging machine in accordance with the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Referring now to the drawings, a packaging machine 10 is illustrated in FIG. 1. The packaging machine 10 produces pouches 12 from a continuous web 14 of material. The web 14 has pre-printed registration marks 62 at spaced intervals corresponding to the desired pouch width. The position of the registration marks with respect to the printed artwork is known on the web. The web is made of sealable material, which includes heat-sealable material (such as polyethylene or polypropylene) and pressure-sensitive cold seal film. The embodiments described below are directed mainly to a machine 10 running heat-sealable web material.

According to the embodiment illustrated in FIG. 1, the packaging machine has an infeed section 4 which supplies the folded web 14 to a sealing section 6. The planar web material is typically provided as a wound roll 16. The infeed section 4 has a reel 18 for supporting the roll 16. The reel 18 rotates to unwind the roll 16, thereby dispensing the web 14. The reel 18 may be conventionally controlled or, as described in greater detail below, may have a dedicated unwind motor 20 for varying an unwind speed. The web 14 is threaded over tension rollers 22 and a plow assembly 24 for folding the web to form side panels 26 joined at a common bottom edge 28. As illustrated in FIG. 1, the bottom edge 28 is formed with a V-shape. The plow assembly 24 may also include a gusset blade (not shown) for forming a W-shaped bottom edge. The folded web 10 is passed through a pair of infeed rolls 30 to cleanly define the fold lines in the web. In accordance with certain aspects of the present invention, the infeed rolls 30 may also pull the web through the first portion of the packaging machine, as described in greater detail below.

The web 14 next travels through a sealing portion of the machine 10 in which any of a number of pouch forming operations take place. In accordance with the embodiment illustrated in FIG. 1, the web 14 first passes through a bottom or first seal station 32 for forming a bottom seal 34, such as a delta seal, in the web 14. The web 14 next passes through a side seal station 38 which forms side seals 40 in the web. Upon leaving the side seal station 38, the web 14 is formed as a strip of pouches interconnected at the side seals 40. The seal stations 32, 38 may use heated seal bars to form seals in heat-sealable web material, or may use unheated seal bars when the web material is a cold seal film. If heated, the seal bars have a heating element such as a heat tube extending therethrough. The heat tube is preferably electrically operated and controlled to provide a desired sealing temperature at the surface of the seal bar.

In accordance with certain aspects of the present invention, the seal stations 32, 38 are operable to form seals in the web 14 as the web advances. In the currently preferred embodiment illustrated in FIGS. 4A and B, the bottom seal station, for example, has a pair of opposing bottom seal bars 36. A sub-support 37 is attached to the rear of each bottom seal bar 36, and each sub-support 37, in turn, is attached to a carriage 56. Each carriage 56 is adapted, such as by bearing sets, to slide along upper and lower tracks 250, 251 which extend along the length of the sealing section, as best shown in FIG. 4B. The sliding carriages 56 allow the bottom seal bars to translate back and forth parallel to the web path, defined herein as longitudinal motion.

The bottom seal bars 36 are further operable in a direction perpendicular to the web path, defined herein as lateral motion. The tracks 250, 251 are attached to end supports slidably mounted on rails 256, 257 extending perpendicular to the web path (FIG. 4B). As a result, the upper and lower tracks 250, 251 are operable in the lateral direction to reciprocate the bottom seal bars 36 into and out of engagement with the web path.

The side seal station 38 has a structure similar to that of the bottom seal station 32. As best shown in FIG. 4A, the side seal station comprises two pairs of opposing side bars 42. Sub-supports 43 are attached to the seal bars 42. The sub-supports 43, in turn, are attached to carriages 58 mounted for translation along the upper and lower tracks 250, 251. As a result, the side seal bars 42 are also operable in both longitudinal and lateral directions.

The combination of the laterally moving tracks 250, 251 and the longitudinally translating carriages 56 allows the seal bars to be driven in a box motion. As best shown in FIG. 5A, the bottom seal bars 36 begin in an initial position, in which the bars are retracted from the web and the carriages 56 are at an upstream position. From the initial position, the carriages 56 are driven downstream at a same speed as the web, as shown in FIG. 5B. With the carriages 56 still moving downstream, the tracks 250, 251 are driven laterally inwardly so that the seal bars 36 engage the web 14 (FIG. 5C). The bottom seal bars 36 are held in the inward position for a period of time sufficient to form a bottom seal as the carriages 56 continue to advance with the web 14 (FIG. 5D). After the bottom seal 34 is formed, the tracks 250, 251 are retracted and the carriages 56 reverse direction so that the web 14 advances downstream relative to the seal bars 36 (FIG. 5E). With the bottom seal bars 36 retracted, the carriages 56 moves longitudinally upstream toward the initial position (FIG. 5F). The bottom seal station 32 then repeats the above-described box motion to form subsequent bottom seals 34. The side seal station 38 is operated in a similar fashion.

In the above embodiment, the sealing stations 32, 38 operate in a duplex mode, in which the web 14 advances two pouch widths between each actuation of the seal bars. Accordingly, the bottom seal bars 36 are two pouch widths wide to simultaneously form two bottom seals 34. Similarly, the side seal station 38 carries two pairs of side seal bars 42. The machine 10 may also be operated in a simplex mode, whereby the web 14 is advanced a single pouch width between each actuation. In simplex mode, the bottom seal bars 36 are only one pouch width wide, and the side seal station 38 has a single pair of side seal bars 42.

In the preferred embodiment, variable speed motors are used to operate the bottom and side seal stations 32, 38 in the box motion. With respect to the bottom seal station 32, a variable speed motor 57 is coupled to each carriage 56 for driving the carriages longitudinally (FIGS. 4A and 4B). The motor 57 is preferably a linear motor having a magnetic rod 261 extending along the length of the sealing section 6. A motor housing 262 is mounted on the carriage 56 and operates back and forth along the rod 261. As a result, movement of the housing 262 along the rod 261 directly drives the attached carriage 56 longitudinally along the upper and lower tracks 250, 251. Motors 59 also drive the side seal carriages 58. The motors are preferably linear motors having housings 267 mounted on the same magnetic rods 261.

The lateral motion of the bottom and side seal bars 36, 42 is also preferably motor driven. A variable speed motor 33 is mechanically linked to the tracks 250, 251 to laterally reciprocate the tracks, thereby driving the seal bars 36, 42 into and out of engagement with the web 14 (FIG. 4B).

While the embodiment illustrated in FIGS. 4A and B is currently preferred, it will be appreciated that other arrangements may be used in accordance with the present invention, as long as the seal bars 36,42 are operable to translate in the longitudinal and lateral directions. For example, as schematically illustrated in FIG. 1, a single carriage mounted under the web may support seal bars on both sides of the web. In such an embodiment, a second motor must be supported on each carriage for driving the lateral motion of the seal bars.

The seal bars are operated to engage the web as the web advances for both continuous and intermittent web motion. It will be appreciated that for intermittent web motion, the machine 10 of the present invention could be operated so that the seal bars engage the web during dwells, as is conventional. In the currently preferred embodiment, however, the seal bars always contact the web as the web advances, regardless of whether the web is advancing continuously or intermittently. By operating the seal stations in this manner, the seal bars will always be in contact with the web for a sufficient period of time to form the seals regardless of the dwell time between each intermittent advance of the web. Furthermore, the machine operates in a similar fashion for both continuous and intermittent web motion, thereby simplifying the controls and providing a machine which operates in a consistent manner.

According to the embodiment illustrated in FIG. 4A, the sealing section further comprises a cooling station 272. The cooling station 272 has cooling bars 273 carried by sub-supports 274. Carriages 275 carry the sub-supports 274 and are mounted on the upper and lower tracks 250, 251. Accordingly, the cooling station 272 is operated in the box motion similar to the bottom and side seal bars 36, 42. The cooling bars, however, are kept at a cool temperature in contrast to the heated seal bars. The cooling bars 273 set the side seals in the web so that the side seals 40 are stronger and do not stretch as the web 14 is pulled through the machine 10. The sealing section may further include additional mechanisms for notching, punching, and emboss coding the web. These additional components are located downstream of the cooling station.

Figure 3:
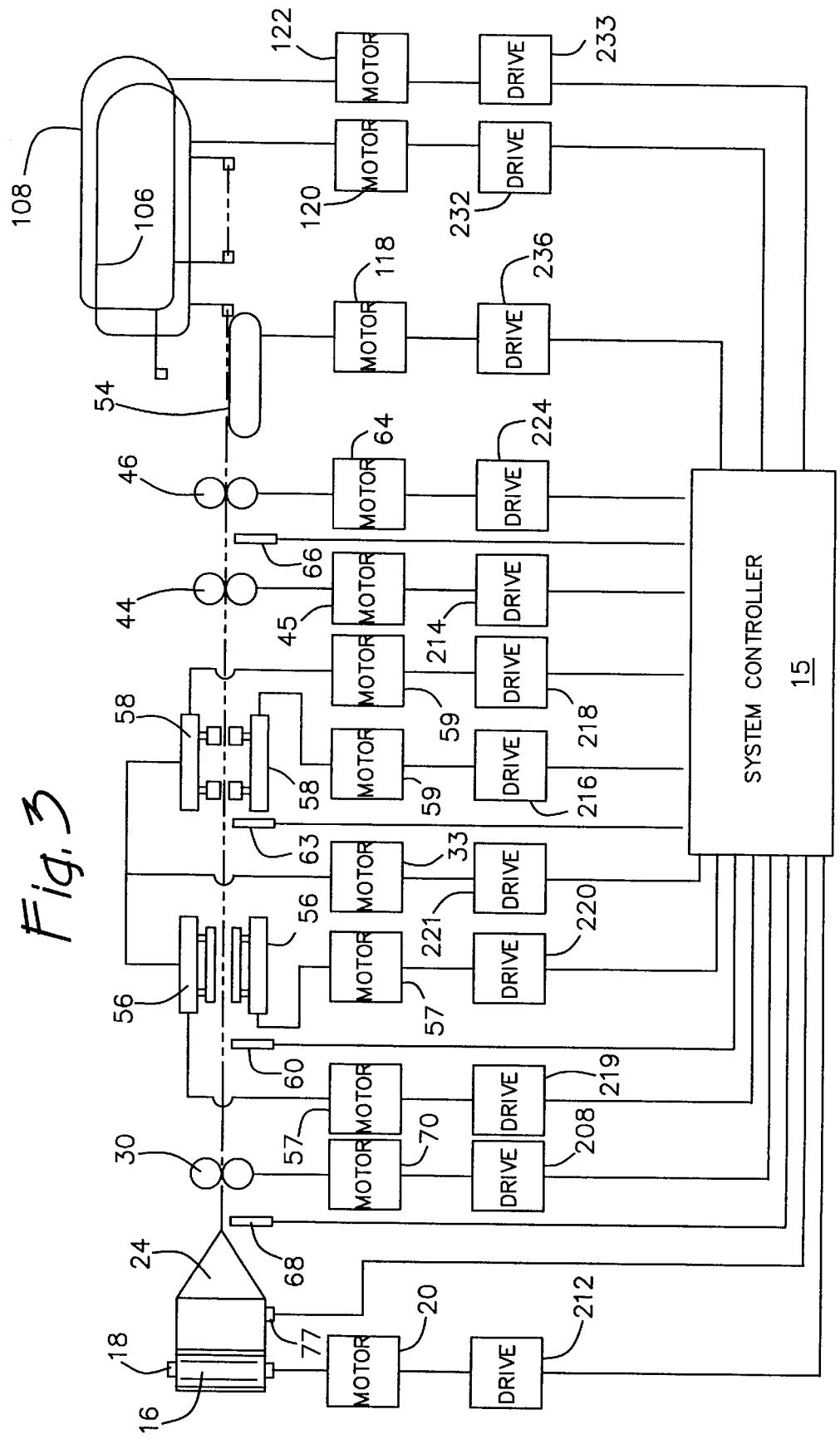
FIG. 3 is a block diagram illustrating the controls of the packaging machine of FIGS. 1 and 2

A pair of drive rolls 44 are located downstream of the seal stations to pull the web through the sealing section of the machine 10 (FIG. 1). The drive rolls 44 are positioned to pinch the web 14, thereby frictionally advancing the web. In accordance with certain aspects of the present invention, the drive rolls are operable both continuously and intermittently. In the preferred embodiment, a variable speed motor, such as drive roll servomotor 45, is coupled to and operates the drive rolls (FIG. 3).

A cutter is positioned immediately downstream of the drive rolls 44 (FIG. 1). According to the present invention, the cutter is adapted to cut the web at the formed side seals as the web advances. In the currently preferred embodiment, the cutter comprises a pair of cutter rolls 46, a first roll having a plurality of circumferentially spaced blades 48 and a second roll having a plurality of similarly spaced cutting surfaces 50. The cutter rolls 46 are mounted for rotation so that a blade 48 contacts the web 14 at the same time as an associated cutting surface 50 to thereby sever a leading pouch 12 from the web. In the preferred embodiment, a variable speed motor 64 operates the cutter rolls 46 (FIG. 3). Each pouch severed by the cutter rolls 46 is then transferred to a pouch filling section 8 by a transfer mechanism 54, as described in greater detail below.

In accordance with the present invention, the above-described components are triggered to perform synchronized operations on the web. A system controller 15 is programmed to adjust a dwell time between operation of the components to thereby adapt the machine 10 for different operating parameters. In the preferred embodiment, the machine 10 uses electronic line shafting to synchronize the motor-driven components. An oscillator generates a pulse stream and is connected to a microprocessor in the system controller 15. The pulse stream corresponds to the web speed such that a given web speed has a corresponding pulse rate. The pulse rate is adjusted proportionally to web speed. As a result, the distance the web advances between pulses is always constant, and components may be placed at locations downstream of a fixed point on the machine which correspond to certain pulse counts. Web speed is defined herein as the instantaneous rate of travel of the web 14 as it advances. Under this definition, web dwell time during intermittent motion is not used to compute the instantaneous web speed.

According to the illustrated embodiment, the machine 10 has an infeed sensor 68 located at a registration point for sensing the registration marks 62 and generating a sync signal as each registration mark passes. The sync signals inform the system that the web is positioned in the machine 10 with a registration mark 62 at the registration point. With a defined registration point, therefore, components may be positioned at known distances downstream of that point and controlled to actuate a determined number of pulses after the registration signal. For example, the first seal station 32 may be positioned 2 feet downstream of the registration point, which may correspond to 1,000 pulses. The system controller 15 may then control the seal station to actuate after 1,000 pulses are counted from the sync signal. The pulse rate is generated such that, for this example, 1,000 pulses correspond to 2 feet of web travel for any web speed.

As noted above, a sync signal indicates that a registration mark 62 is passing the sensor 68. The registration marks 62 are longitudinally spaced at pouch width intervals along the web 14 so that consecutive sync signals indicate that the web has advanced one pouch width, defined herein as a cycle. In the most preferred embodiment, therefore, the web-engaging components are positioned downstream of the infeed at pouch width intervals. As a result, the components are controlled to operate with reference to each sync signal.

The pulse stream allows the machine 10 to be quickly and easily adapted to form pouches of various sizes. As noted above, the components of the machine may be positioned at pouch width intervals. If the pouch width is changed, the position of the components must also be adjusted for the new width. Using the example presented above, the first seal station 32 may be repositioned 1 foot downstream of the registration point rather than 2 feet. The microprocessor of the system controller 15 may be programmed so that, for the new position, the first seal station 32 is actuated after 500 pulses are counted from the sync signal thereby adjusting the dwell period of the first seal station. The servomotors 57, 59 of the carriages 56, 58 allow the first and second seal stations 32, 38 to be quickly and easily repositioned for the new pouch width. Furthermore, the system controls are programmed to modify the dwell periods between component operations. Accordingly, the pouch making machine 10 of the present invention is quickly and easily adapted for various pouch sizes.

The above-described box motion of the seal stations 32, 38 is also preferably timed using the pulse stream. Accordingly, the carriages 56 of the bottom seal station 32 are controllably positioned a known distance downstream of the infeed sensor 68. As diagrammatically illustrated in FIG. 3, the system controller 15 controls drives 219, 220 to generate a drive signal to the carriage motors 57 to move the carriages 56 downstream at a speed equal to the web speed after a predetermined pulse count. As the carriages 56 move, the system controller 15 signals the reciprocating motor 33 through drive 221 to actuate the bottom seal bars 36 laterally inward after a predetermined number of pulses have elapsed after each sync signal. The motor 33 holds the bottom seal bars 36 in the inward position for another predetermined number of pulses corresponding to a sufficient period of time to form a seal in the web. Once the seal is formed, the bottom seal bars are retracted and the carriages 56 are driven upstream to the initial position. The same procedure is followed after each sync signal. The side seal station is operated in the same fashion. While the use of a pulse stream is preferred, it will be appreciated that other types of controls may be used to actuate the seal stations, such as the use of optical sensors which provide a feedback signal to initiate actuation of the components.

In the preferred embodiment, the drive roll servomotor 45 is also controlled by the system controller 15 using the pulse stream. The user selects a desired web speed and a pulse rate corresponding to that web speed is generated. The system controller 15 delivers a drive signal through drive 214 to the drive roll motor 45 to operate the drive rolls at the appropriate speed (FIG. 3).

In accordance with certain aspects of the present invention, the seal stations 32, 38 are provided with automatic registration to the web 14. To accomplish registration, a sensor is coupled to the carriage motors of each seal station. The sensor senses the registration marks 62 and delivers a seal registration signal. The bottom seal station 32, for example, carries a bottom seal sensor 60, as shown in FIGS. 1 and 3. The controller 15 receives the signal and drives the carriage motors 57 to position the carriages 56 relative to the registration mark 62 so that the bottom seal bars 36 are positioned over appropriate seal points on the web. As a result, the bottom seal station via the controler 15 32 is continually and automatically registered with the web 14. Any carriage position adjustments required for registration are compensated for by the microprocessor in the system controller 15, so that the box motion is executed in registration with the web 14. The side seal station 38 has a side seal sensor 63 for effecting similar registration. As shown in FIG. 3, the carriage motors 59 have drives 216, 218 coupled to the system controller 15. The sensor 63 delivers a location signal to the controller 15 which, in turn, adjusts the drive signals sent to the motors 59.

In the preferred embodiment, the cutter rolls 46 are independently controlled to register with the web 14. A cutter sensor 66 is mounted a fixed distance upstream of the cutter rolls 46 for sensing the registration marks 62 and delivering a cut signal. The system controller 15 signals a drive 224 in response to the cut signal to control the speed of the cutter motor 64 so that the cutter rolls 46 form a cut through each side seal 40 (FIG. 3). Because the distance between the cutter sensor 66 and the cutter rolls 46 is known, the cutter servomotor 64 may be programmed to dwell for a given number of pulses upon receiving the cut signal before actuating the cutter rolls 46. Furthermore, the pulse count is easily changed by the controller 15 to adjust the dwell, thereby adapting the cutter for different operating parameters.

In a preferred embodiment, the infeed rolls 30 are controlled to provide a registered web to the sealing section. The infeed rolls 30 are driven by a variable speed motor 70, such as a servomotor. The infeed sensor 68 is located immediately upstream of the infeed rolls 30 and senses the registration marks 62, as noted above. The system controller 15 compares the sync signals from the infeed sensor 68 with the desired web speed and adjusts a drive signal provided by drive 208 to the infeed motor 70 (FIG. 3). In intermittent mode, the infeed motor 70 is controlled so that the web 14 is advanced past the infeed rolls 30 by a predetermined distance. In continuous mode, the infeed rolls 30 are controlled so that the actual web speed, as measured by the infeed registration signals, matches the desired web speed. In either mode, operation of the infeed rolls is adjusted so that a registered web is supplied to the sealing section.

The infeed rolls 30 provide a second point at which the web 14 is pulled through the machine 10. The infeed rolls 30 engage the web 14 at a point upstream of the sealing section 6 to pull the web through the infeed section. As a result, the amount of web stretch through the sealing section is minimized, thereby improving the accuracy of the machine.

In the preferred embodiment, the unwind reel 18 is power-driven to reduce tension spikes in the web 14. The reel motor 20 has a drive 212 coupled to the system controller 15. As a result, the controller adjusts reel speed according to downstream web demand. For example, in intermittent mode, the web 14 is advanced through the seal station 6 at an average speed. The reel 18 is controlled to operate at an average speed which matches that of the web through the seal section. The roll 16 is relatively heavy, and therefore has too much inertia to stop and start to match actual web demand. The system controller therefore drives the reel motor 20 in a controlled cycle in which motor speed is increased and decreased for each intermittent increment of web travel. In continuous mode, the reel motor 20 is driven at a more consistent speed. In either mode, the reel motor 20 unwinds the roll 16 to thereby reduce tension spikes in the web.

An accumulator 76 is provided for storing a buffer length of web material. As shown in FIG. 1, the accumulator 76 is preferably located between the plow 24 and the reel 18. The accumulator has translating rolls 74, 75 and is fixed to pivot about a point 78. Fixed rolls 73 are also positioned near the accumulator 76. When the web 14 is threaded through the accumulator 76, it will be appreciated that the accumulator stores a buffer length of web material. Depending on downstream demand, the accumulator may pivot clockwise or counter-clockwise about point 78. When rotating counter-clockwise, the accumulator 76 stores additional web material. When the accumulator 76 rotates clockwise, web material is played out from the buffer. Accordingly, it will be appreciated that the accumulator 76 provides a festoon for storing the buffer length of web.

In a preferred embodiment, the position of the accumulator 76 is used to indicate downstream web demand and to adjust the reel motor 20 speed accordingly. As shown in FIG. 1, an air cylinder 80 is connected to a bottom arm 82 of the accumulator 76. Rotation of the accumulator 76 extends or retracts the air cylinder 80. A sensor 77 is coupled to the air cylinder 80 to measure the position of the air cylinder and generate a position signal to the controller 15. In response to this signal, the controller 15 increases or decreases the speed of the reel motor 20 to bring the reel unwind speed in line with downstream web demand.

The above-described reel control minimizes the amount of festoon area needed in the infeed section 4. The reel motor 20 is controlled to adjust speed according to downstream demand. As a result, the amount of spare web material needed to be stored in a festoon is minimized. The reduced festoon, in turn, reduces the amount of floor space needed for the machine.

The infeed section may further include a rotary delta punch 86 adapted for continuous web advancement. A delta punch forms holes in the web before the web is folded to have a gusseted W-shaped bottom edge. The holes are located so that they are formed through the inside gusset walls. As a result, when the vertical seals are formed, the side panels seal with one another through the holes to form a free-standing pouch.

The delta punch 86 of the present invention is suitable for both continuous and intermittent web motions. Accordingly, the delta punch comprises a punch roll 88 and die roll 90 disposed on opposite sides of the web, as shown in FIG. 6. The punch roll 88 has two lateral sections 88a, 88b connected by a spacer bolt 87 having both left- and right-handed threads. When the spacer bolt 87 is rotated in a first direction, the lateral sections 88a, 88b move away from one another and, when rotated in an opposite direction, the sections move toward one another. Regardless of their position, the lateral sections 88a, 88b are spaced an equal distance from a web centerline. Each lateral section carries at least one punch 89 and the punches of each lateral section are aligned to form pairs of delta holes.

The die roll 90 also has two lateral sections 90a, 90b connected by another spacer bolt 81 having left- and right-handed threads, thereby controlling the position of the lateral sections of the die roll in a similar manner as the punch roll 88. Each lateral section 90a, 90b also has at least one die 91, and the dies of each lateral section are aligned to form die pairs. In operation, the punch and die rolls 88, 90 rotate so that the punches 89 correspond to the dies 91 as the web passes between the rolls to form pairs of delta holes.

A variable speed motor 92 is drivingly connected to the delta punch 86 to provide independent registration with the web 14. The motor 92 controls rotation of the punch and die rolls 88, 90. A delta punch sensor 94 senses the registration marks 62 on the web 14 and delivers a delta punch signal. The system controller 15 is responsive to the delta punch signal to drive the delta punch servomotor. The controller 15 triggers the servomotor 92 to rotate the punch and die rolls 88, 90 so that they form delta holes 85 at the appropriate points on the web relative to the registration marks 62. The spacer bolts 87, 81 of both the punch and die rolls 88, 90 may further be motor-driven to adjust the lateral width between the delta holes. Accordingly, the rotary delta punch 86 allows quick and easy adjustment of the delta hole locations on the web to provide for different size pouches, and provides for automatic registration of the delta punch.

Figure 2:
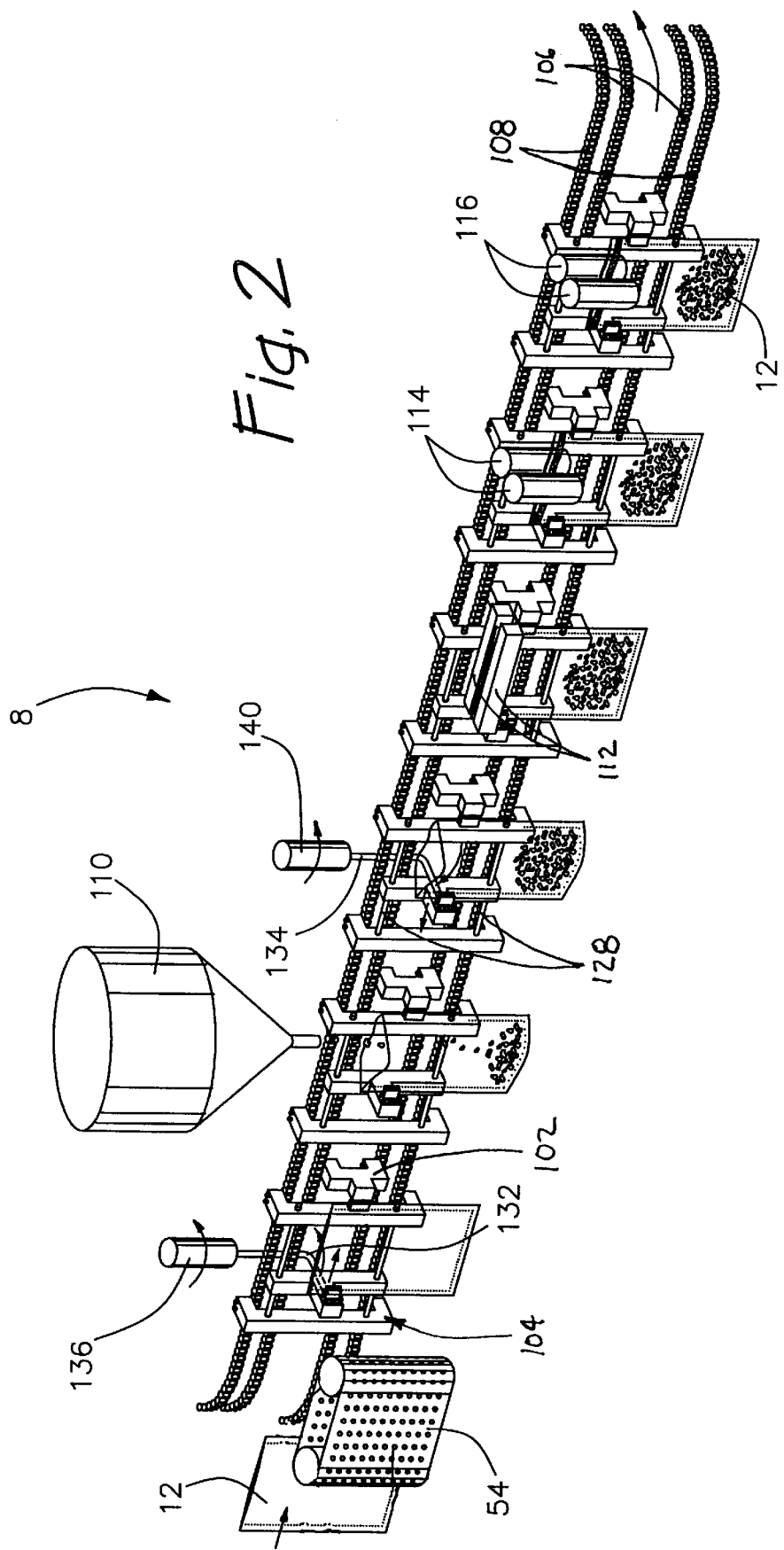
FIG. 2 is an enlarged perspective view of a pouch filler section for use with the packaging machine of FIG. 1.

The machine 10 further incorporates a pouch filling section 8 for filling and sealing the formed pouches. At the outlet of the sealing section, the transfer mechanism 54 carries severed pouches from the cutter rolls 46 to leading and trailing clamps 102, 104 of the filler section. The clamps are carried on first and second endless carriers, illustrated in FIG. 2 as first and second chain sets 106, 108. It will be appreciated that other types of endless carriers, such as timing belts or metal bands, may also be used in accordance with the present invention. Furthermore, each endless carrier may comprise a single member, or a set of multiple members, FIG. 2 illustrating the latter by showing first and second chain sets 106, 108 comprising a pair of chains. The clamps are carried along a path which leads through a pouch filler 110. Once filled, the top edges of the pouches pass through radiant heater bars 112 which soften the pouch material. The pouches 12 with softened upper edges are then fed through a pair of upper seal rolls 114 to form an upper seal. The pouches then pass through a pair of cool rolls 116 to set the upper seal, after which each pouch 12 is picked off and transported from the filler section.

In accordance with the present invention, a variable speed motor 118 operates the transfer mechanism 54 to transfer each severed pouch 12 from the cutter rolls 46 to the clamps 102, 104 (FIG. 3). The transfer motor 118 has an associated drive 236 for providing a variable drive signal and is coupled to the system controller 15. It will be appreciated that, because of spacing between the clamps, the clamps are operated at a clamp speed greater than the web speed. The transfer mechanism 54, accordingly, is driven at a transfer speed which is slightly greater than the clamp speed. When first gripping a pouch, the transfer mechanism slides against the surface of the pouch until the pouch is severed from the web. Similarly, the transfer mechanism slides against the pouch until the pouch is carried away.

In the preferred embodiment, the transfer mechanism 54 provides a registration buffer between the sealing and pouch filling sections. The transfer speed of the transfer mechanism 54 may be independently controlled so that the components of the sealing section need not operate in registration with the clamps 102, 104 of the pouch filling section. As a result, the sealing and pouch filling section may be independently registered with the web and pouches, respectively. Registration between the components of the sealing and pouch filling sections is not required, and therefore the entire machine 10 ay be brought into registration with the web 14 more quickly and with minimal wasted web material.

In the preferred embodiment, leading and trailing variable speed motors 120, 122 operate the leading and trailing chain sets 106, 108. A drive 232 provides a variable signal to the leading chain set motor 120 and is coupled to the system controller 15 (FIG. 3). The trailing chain motor also has a drive 233 and is similarly controlled. The leading and trailing chain servos 120, 122 operate the leading and trailing chain sets 106, 108 with a phase distance between the two so that the leading and trailing clamps 102, 104 are separated by about a pouch width. The leading and trailing chain servos 120, 122 allow the phase distance to be adjusted to accommodate different size pouches. It will be appreciated that for any phase distance, the chains may be operated at the same speed so that bags held in the clamp are not stretched or crushed.

In the embodiment illustrated in FIG. 2, the trailing clamp 104 is moveable to allow the top of the pouch to be opened and closed. The trailing clamp 104 comprises supports 126 which are connected to the trailing chain set 108, preferably comprising a pair of chains. A pair of support arms 128 are attached to the supports. A clamp holder 130 is slideably mounted on the support arms 128 for movement between closed and open pouch positions. In the closed pouch position, as best shown by the left-hand pouch illustrated in FIG. 2, the clamp holder 130 is positioned near the upstream extent of the support arms 128. The clamp holder 130 is slidable on the support arms 128 to an open pouch position as best shown by the trailing clamp 104 located below the filler 110 in FIG. 2. In the open pouch position, the clamp holder 130 is positioned midway along the support arms 128 so that the clamp holder 130 is relatively closer to the leading clamp 102. It will be appreciated that in a pouch 12 held by clamps in the open position, the side walls of the pouch 12 expand outwardly away from one another to allow access to the interior of the pouch.

In operation, the clamps 102, 104 are in the closed position as the pouches 12 are transferred from the sealing section. Before the pouch reaches the pouch filler 110, the clamp holder 130 is moved to the open position to facilitate filling of the pouch. The clamp holder 130 remains in the open position as the clamps pass through the pouch filler and the pouches are filled with product. After exiting the pouch filler 110, the clamp holder 130 is repositioned back toward the closed position to allow the top edge to be sealed.

In accordance with certain aspects of the present invention, the clamp holder 130 is repositioned using servo-controlled upstream and downstream mechanisms. As best shown in FIG. 2, the upstream pouch-opening mechanism comprises an advance arm 132 positioned before the pouch filler 110. The advance arm 132 has an initial position in which the arm is located outside of the web path. As the clamp holder 130 passes, the advance arm 132 rotates to engage a rear face of the clamp holder 130 and slide it toward the open pouch position. The advance arm 132 completes a full revolution to return to the initial position. If the upstream mechanism has dual arms, the arms complete a half revolution. The advance arm 132 is driven by a motor 136 phased with the system controller 15 so that the advance arm rotates during each cycle.

The downstream pouch closing mechanism preferably comprises a retard arm 134 controlled similar to the advance arm 132. The retard arm 134 extends into the path of the passing clamp holder 130 to impede further advancement of the clamp holder 130. Once the clamp holder 130 reaches the closed position, the retard arm 134 is rotated out of the path to allow the clamp holder 130 to pass. The retard arm 134 executes a full revolution to return to the initial position to await the next clamp holder 130. Rotation of the retard arm 134 is controlled by a retard servomotor 140. The retard servomotor 140 is controlled by the system controller 15 so that operation of the retard arm 134 is phased with the system. Accordingly, the retard servomotor 140 is actuated so that it dwells for a portion of each cycle before rotating. During the dwell, the retard arm 134 engages and pushes the clamp holder 130 toward the open pouch position. The downstream mechanism may have two arms spaced by 180 degrees. For such an embodiment, the arms rotate one-half revolution during each cycle.

As noted above, the filled and closed pouches 12 are then passed between radiant heater bars 112 and top seal rolls 114 to seal the upper edge of the pouches. The pouches may further pass through cool rolls 116 to set the upper seal before being discharged. The top seal rolls 114 and cool rolls 116 are driven by variable speed motors connected to the system controller 15.

In light of the above, it will be appreciated that the present invention provides a new and improved packaging machine for forming pouches from a web of material. The position of each component of the machine is servo-controlled to allow quick and easy adjustment for different pouch sizes. In addition, the components are independently registered with the web through the use of sensors. As a result, the machine may be brought back into registration with minimal web waste. Furthermore, the packaging machine is capable of running either a continuously or intermittently advancing web. The seal bars are mounted on moveable carriages which move in unison with the web during contact. The delta punch and cutter rolls are rotary to further adapt the machine for continuous or intermittent operation. As a result, the user may select the most efficient mode of operation for the type of pouch filler used with the machine and the type of pouch being formed.

What is claimed is:

1. Apparatus for forming a plurality of unfilled pouches from a folded flexible web for subsequent filling, the folded web advancing downstream at web speed along a predetermined continuous web path and having registration marks at spaced intervals, the apparatus comprising:

a pair of drive rolls disposed to engage the web, a servo controlled motor for controlling the speed of the drive rolls;

a pair of seal bars, the seal bars operable to pinch either side of the web path, at least one servo controlled motor for operating the seal bars to engage the web to form registered seals therein as the web is driven downstream;

a cutter positioned downstream of the drive rolls, the cutter operable to engage the web, a cutter sensor located a fixed distance upstream of the cutter for sensing the registration marks and delivering a cut signal, a variable speed motor drivingly connected to the cutter and responsive to the cut signal to actuate the cutter at cut points relative to the registration marks to form registered unfilled pouches for subsequent filling; and a carriage is attached to each seal bar, each carriage movable in a longitudinal direction along the web path, a seal sensor for sensing the registration marks and delivering a registration signal, and a variable speed motor drivingly connected to the carriages for controlled longitudinal placement along the web path, the motor responsive to the registration signal to position the seal bars relative to the registration marks.

2. Apparatus for forming a plurality of unfilled pouches from a folded flexible web for subsequent filling, the folded web advancing downstream at web speed along a predetermined continuous web path and having registration marks at spaced intervals, the apparatus comprising:

a pair of drive rolls disposed to engage the web, a servo controlled motor for controlling the speed of the drive rolls;

a pair of seal bars, the seal bars operable to pinch either side of the web path, at least one servo controlled motor for operating the seal bars to engage the web to form registered seals therein as the web is driven downstream;

a cutter positioned downstream of the drive rolls, the cutter operable to engage the web, a cutter sensor located a fixed distance upstream of the cutter for sensing the registration marks and delivering a cut signal, a servo controlled motor drivingly connected to the cutter and responsive to the cut signal to actuate the cutter at cut points relative to the registration marks to form registered unfilled pouches for subsequent filling;

an infeed sensor located a fixed distance upstream of the initial position of the seal bars, the infeed sensor sensing the registration marks and delivering a sync signal; and a controller that generates a pulse rate corresponding to the web speed, the controller synchronizing actuation of the servo controlled motors by actuating the motors after a preset number of pulse counts are counted after each sync signal.

3. Apparatus for forming a plurality of unfilled pouches from a folded flexible web for subsequent filling, the folded web advancing downstream at web speed along a predetermined continuous web path and having registration marks at spaced intervals, the apparatus comprising:

a pair of drive rolls disposed to engage the web, a servo controlled motor for controlling the speed of the drive rolls;

a pair of seal bars, the seal bars operable to pinch either side of the web path, at least one servo controlled motor for operating the seal bars to engage the web to form registered seals therein as the web is driven downstream;

a cutter positioned downstream of the drive rolls, the cutter operable to engage the web, a cutter sensor located a fixed distance upstream of the cutter for sensing the registration marks and delivering a cut signal, a variable speed motor drivingly connected to the cutter and responsive to the cut signal to actuate the cutter at cut points relative to the registration marks to form registered unfilled pouches for subsequent filling;

a pouch filling section located downstream of the cutter, the pouch filling section having an inlet and clamps supported on endless carriers, the endless carriers controllable to operate the clamps at a clamp speed along a clamp path, a portion of the clamp path disposed near the inlet;

a transfer mechanism having a gripping surface extending from the cutter to the inlet of the pouch filling section, the gripping surface mounted for longitudinal movement, a variable speed motor drivingly connected to the transfer mechanism and driving the gripping surface at a transfer speed; and a controller for controlling the transfer mechanism motor such that the transfer speed is greater than the web and clamp speeds.

4. The pouch apparatus of claim 3 in which the transfer mechanism is a vacuum belt entrained about a pair of rollers, the transfer servo motor coupled to one of the rollers.

5. Apparatus for forming a plurality of unfilled pouches from a folded flexible web for subsequent filling, the folded web advancing downstream at web speed along a predetermined continuous web path and having registration marks at spaced intervals, the apparatus comprising:

a pair of drive rolls disposed to engage the web, a servo controlled motor for controlling the speed of the drive rolls;

a pair of seal bars, the seal bars operable to pinch either side of the web path, at least one servo controlled motor for operating the seal bars to engage the web to form registered seals therein as the web is driven downstream;

a cutter positioned downstream of the drive rolls, the cutter operable to engage the web, a cutter sensor located a fixed distance upstream of the cutter for sensing the registration marks and delivering a cut signal, a variable speed motor drivingly connected to the cutter and responsive to the cut signal to actuate the cutter at cut points relative to the registration marks to form registered unfilled pouches for subsequent filling; and a delta punch located upstream of the seal bars, the delta punch having a rotary punch roll carrying a pair of laterally aligned punches, a rotary die roll carrying a pair of laterally aligned dies, the punch and die rolls aligned so that the punches register with the dies as the punch and die rolls rotate, the delta punch thereby capable of operating in either continuous or intermittent modes, and a variable speed motor drivingly connected to the punch and die rolls, the motor controllably rotating the punch and die rolls.

6. The pouch machine of claim 5 further comprising a delta punch sensor located a fixed distance upstream of the delta punch, the delta punch sensor sensing the registration marks and delivering a delta punch signal, the delta punch motor responsive to the delta punch signal to rotate the punch and die rolls at delta punch positions relative to the registration marks.

* * * * *